W. T. CARROLL.
Spindle-Adjusting Mechanism for Spinning-Machines.
No. 223,992. Patented Feb. 3, 1880.
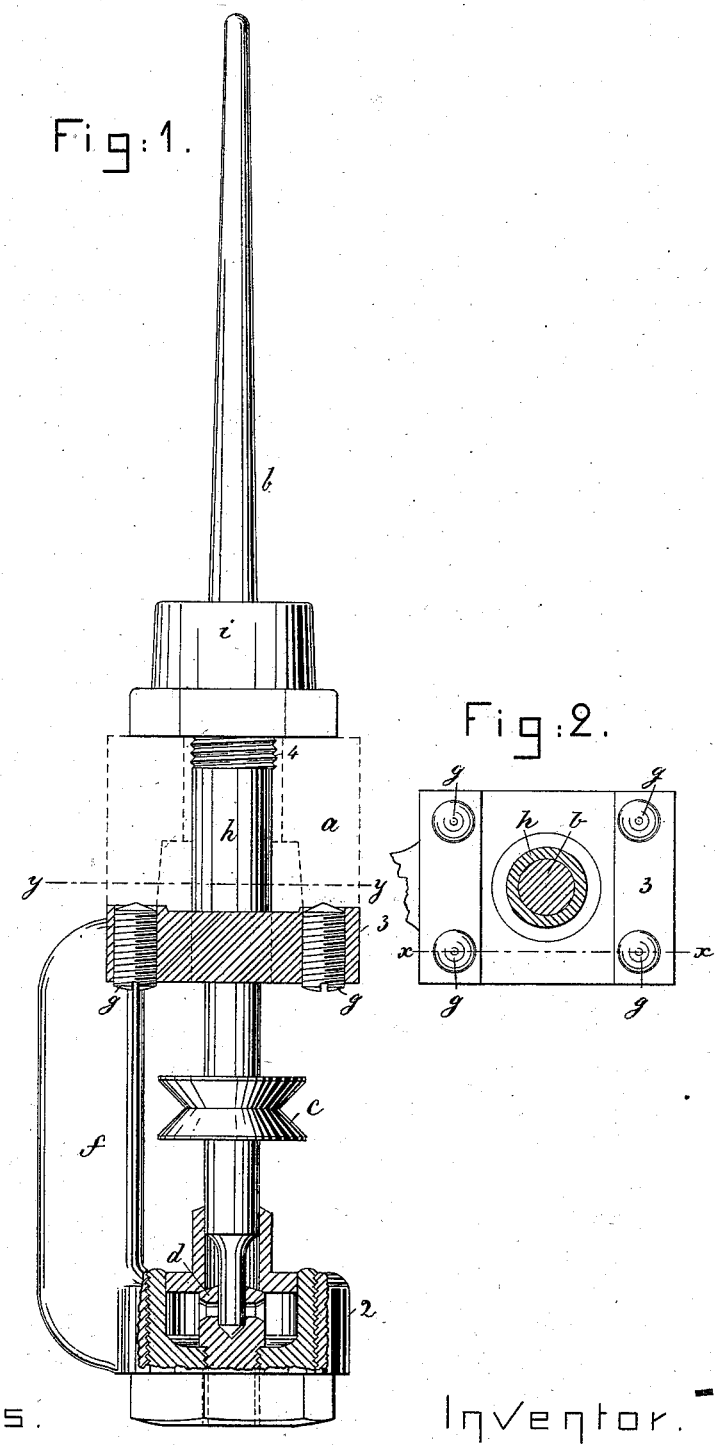
Witnesses.
A. Hunnewadel
L. F. Connor
Inventor.
William T. Carroll.
by Crosby & Gregory, Attys

UNITED STATES PATENT OFFICE.

WILLIAM T. CARROLL, OF WORCESTER, ASSIGNOR TO GEORGE DRAPER & SONS, OF HOPEDALE, MASSACHUSETTS.

SPINDLE-ADJUSTING MECHANISM FOR SPINNING-MACHINES.

SPECIFICATION forming part of Letters Patent No. 223,992, dated February 3, 1880.

Application filed October 4, 1879.

*To all whom it may concern:*

Be it known that I, WILLIAM T. CARROLL, of Worcester, of the county of Worcester and State of Massachusetts, have invented an Improvement in Spindle-Adjusting Mechanism for Spinning-Machines, of which the following description, in connection with the accompanying drawings, is a specification.

This invention relates to improvements in spinning-machines, and has for its object such a construction of parts as will permit the spindle or its bearing or bearings to be adjusted into true vertical position.

In this my invention, as herein shown, the spindle-bearing and foot-step are held in a bearing-frame provided with adjusting devices, shown as screws, adapted to act upon the under surface of the bolster-rail at opposite sides of the spindle-opening, to thereby adjust and secure the bearing-frame upon the said rail in such position that the spindle held by the bearings of the bearing-frame shall stand in proper vertical position.

Figure 1 shows in dotted lines the bolster-rail of an ordinary spinning-frame with a spindle and my bolster-bearing-holding plate or frame applied to it, one side of the bearing-holding plate being in section on the line $x\,x$, Fig. 2; and Fig. 2 is a section on the line $y\,y$, Fig. 1, the bolster-rail being omitted.

The spindle and bearing holding plate or frame herein shown are adapted to be used in a ring-spinning frame.

In the drawings, $a$ will be supposed to represent the bolster-rail of a common form of spinning-frame.

The spindle $b$, provided with the whirl $c$, has its foot-step at the lower end, 2, of the bearing-frame $f$, which has at its upper end the bolster-bearing-holding plate 3, provided, as herein shown, with four adjusting devices, $g$, shown as screws, one at each corner of the plate, (see Fig. 2,) the points of the said screws being adapted to bear against the under side of the bolster-rail or its flanges, as shown in the drawings.

The bolster-bearing $h$, or that one which acts only upon the sides of the spindle, is attached to the plate 3, and at its upper end the bolster is provided with screw-threads 4, to receive a screw-threaded fastening or supporting nut, $i$, made hollow or cup-shaped at its upper end to receive oil or other lubricant, which is to reach the spindle by passing through suitable holes in the bolster $h$. When the bolster-bearing-holding frame herein shown is employed the usual foot-step rail will be dispensed with.

In operation, the bolster containing the spindle will be inserted through an opening in the bolster-rail until the plate 3 meets the under side of the said rail, when the nut $i$ will be turned down in contact with the top of the bolster-rail. In this condition, by turning the screws $g$ more or less through the plate 3 and manipulating the nut $i$, (the screws being in contact with the under side of the bolster-rail,) the spindle-bearings may be placed in such position as will insure a true vertical position for the spindle, in order that it may run truly and concentrically with relation to the center of the spinning-ring and its race.

It is obvious that this method of adjusting the bearing and spindle might be practiced in a machine wherein the parts $f$ and 2 of the bearing-frame were omitted. In such case, however, the foot-step would be adjustable or loosely held in any proper or usual way in a foot-step rail.

The nut $i$ prevents the descent of the bolster and its frame and spindle, and I denominate it the plate or frame supporting device.

I claim—

The bolster, its holding-plate and plate-supporting device, adapted to bear against the upper surface of the bolster-rail, combined with the adjusting-screws to bear or act upon the under surface of the bolster-rail at opposite sides of the spindle-opening therein, to adjust the bearing, as described, and insure a true vertical position for the spindle, substantially as set forth.

In testimony whereof I have signed my name to this specification in the presence of two subscribing witnesses.

WILLIAM T. CARROLL.

Witnesses:
WM. F. DRAPER,
EDGAR A. BROWNING.